(12) United States Patent
Chapman et al.

(10) Patent No.: US 11,176,811 B2
(45) Date of Patent: Nov. 16, 2021

(54) SYSTEM AND METHOD FOR MONITORING TRAFFIC CONTROL DEVICES

(71) Applicant: Transportation IP Holdings, LLC, Norwalk, CT (US)

(72) Inventors: Jerrid D. Chapman, Belle Vernon, PA (US); Francois P. Pretorius, Paonia, CO (US); Craig K. Green, Jefferson Hills, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 16/690,152

(22) Filed: Nov. 21, 2019

(65) Prior Publication Data

US 2021/0158689 A1    May 27, 2021

(51) Int. Cl.
*G08G 1/01* (2006.01)
*G08G 1/0968* (2006.01)
*G01C 21/34* (2006.01)
*G08G 1/0967* (2006.01)

(52) U.S. Cl.
CPC ....... *G08G 1/0112* (2013.01); *G01C 21/3415* (2013.01); *G01C 21/3492* (2013.01); *G08G 1/0129* (2013.01); *G08G 1/0133* (2013.01); *G08G 1/0145* (2013.01); *G08G 1/096775* (2013.01); *G08G 1/096844* (2013.01)

(58) Field of Classification Search
None
See application file for complete search history.

(56) References Cited

U.S. PATENT DOCUMENTS

| | | |
|---|---|---|
| 6,996,461 B2 | 7/2006 | Kane |
| 7,236,860 B2 | 6/2007 | Kane |
| 7,467,032 B2 | 12/2008 | Kane |
| 7,742,850 B2 | 6/2010 | Kane |
| 8,714,494 B2 | 5/2014 | Weber |
| 9,002,545 B2 | 7/2015 | Wilson |
| 9,168,936 B2 | 10/2015 | Grimm |
| 9,233,698 B2 | 1/2016 | Weber |
| 9,283,945 B1 | 3/2016 | Kemwein |
| 9,460,566 B2 | 4/2016 | Allwardt |
| 9,469,310 B2 | 10/2016 | Kemwein |
| 9,846,025 B2 | 12/2017 | Kirchner |
| 9,950,718 B2 | 4/2018 | Naylor |

(Continued)

*Primary Examiner* — John F Mortell
(74) *Attorney, Agent, or Firm* — The Small Patent Law Group LLP; Mary D. Lawlor (57) ABSTRACT

A system and a method for monitoring route devices in a transportation network includes one or more processors to receive sensed traffic control device information from first vehicle systems in a transportation network formed from interconnected routes. The sensed traffic control device information indicates states of traffic control devised at intersections between the routes in the transportation network. The one or more processors determine whether the sensed traffic control device information conflicts with stored traffic control device information stored in a database accessible by the one or more processors. The one or more processors send one or more bulletins to one or more second vehicle systems to change movement of the one or more second vehicle systems responsive to determining that the sensed traffic control device information conflicts with the stored traffic control device information.

20 Claims, 3 Drawing Sheets

(56) References Cited

U.S. PATENT DOCUMENTS

| | | |
|---|---|---|
| 10,077,033 B2 | 9/2018 | Oswald |
| 10,081,378 B2 | 9/2018 | Ruhland |
| 2009/0105920 A1 | 5/2009 | Fenske |
| 2011/0115647 A1* | 5/2011 | Mukaiyama ..... G08G 1/096716 340/907 |
| 2016/0075356 A1 | 3/2016 | Kull |
| 2017/0043797 A1* | 2/2017 | Allshouse |
| 2017/0084172 A1* | 3/2017 | Rolle ..................... G08G 1/04 |
| 2017/0132919 A1* | 5/2017 | Ioli ..................... G08G 1/0116 |
| 2020/0066148 A1* | 2/2020 | Werner ............ G08G 1/096791 |

* cited by examiner

SYSTEM AND METHOD FOR MONITORING TRAFFIC CONTROL DEVICES

BACKGROUND

Technical Field

The subject matter described relates to systems and methods that monitor traffic control devices of a route.

Discussion of Art

Some transportation networks include traffic control devices or systems that direct a vehicle from moving in one direction, to move in a different direction. For example, switches on rail routes may change the direction of a rail vehicle to move along one segment of the rail route to move along a different segment of the rail route. Alternatively, the traffic control devices may also be a traffic light that directs pedestrians, automobiles, or the like, from moving along one path, to move along a different path.

But, one or more characteristics of these traffic control devices may be unknown, such as locations, a state (e.g., a health, status, or the like), etc. For example, if a vehicle is moving along a route and comes upon a traffic control device, such as a traffic light or a rail switch, and the state of the traffic control device is incorrect, then the vehicle may continue moving in an incorrect direction, or the vehicle may need to stop in order to correct the direction of movement. This can pose a risk if the vehicle continues traveling in the incorrect direction or if the vehicle stops on the route.

BRIEF DESCRIPTION

In one or more embodiments, a system includes one or more processors to receive sensed traffic control device information from first vehicle systems in a transportation network formed from interconnected routes. The sensed traffic control device information indicates states of traffic control devised at intersections between the routes in the transportation network. The one or more processors determine whether the sensed traffic control device information conflicts with stored traffic control device information stored in a database accessible by the one or more processors. The one or more processors send one or more bulletins to one or more second vehicle systems to change movement of the one or more second vehicle systems responsive to determining that the sensed traffic control device information conflicts with the stored traffic control device information.

In one or more embodiments, a method includes receiving sensed traffic control device information from first vehicle systems in a transportation network formed from interconnected routes. The sensed traffic control device information may indicate states of traffic control devices at intersections between the routes in the transportation network. A determination is made whether the sensed traffic control device information conflicts with stored traffic control device information stored in a database, and one or more bulletins may be sent to one or more second vehicle systems to change movement of the one or more second vehicle systems responsive to determining that the sensed traffic control device information conflicts with the stored traffic control device information.

In one or more embodiments, a system for monitoring route devices in a transportation network includes one or more processors that receive sensed route device information from first vehicle systems in the transportation network formed from interconnected routes. The sensed route device information may indicate states of route devices at intersections between the routes in the transportation network. The one or more processors determine whether the sensed route device information conflicts with the stored route device information stored in a database accessible by the one or more processors. The processors send one or more bulletins to one or more second vehicle systems to change movement of the one or more second vehicle systems responsive to determining that the sensed route device information conflicts with the stored route device information. The processors remotely control movement of at least one of the first vehicle systems responsive to determining that the sensed route device information conflicts with the stored route device information.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to vehicle systems and methods that receive sensed traffic control device information from vehicle systems in a transportation network. The transportation network may represent or be formed from interconnected routes and may include plural traffic control devices disposed along the route. In one or more embodiments, the traffic control device may be referred to herein as a route device, a traffic control device, or any alternative device that controls movement of traffic at intersections formed by the interconnected routes of the transportation network. The traffic control devices include one or more device sensor assemblies that may sense and communicate information about the respective traffic control device with the vehicle system. In one embodiment, the vehicle system may be a rail vehicle system that moves along a rail that includes a switch having one or more switch sensors.

The traffic control device sensor assemblies can communicate sensed traffic control device information with sensor assemblies disposed onboard the vehicle system. A communication system of the vehicle system may communicate a sensor signal including the sensed traffic control device information with an off-board database or a database-like structure, such as a back-office server of a positive train control system. The sensed traffic control device information may include an identification of the device, a location of the device, a state of the device, or the like. For example, the traffic control device may be a rail switch, and the rail switch may be in a first position or in a second position. The first position may be a correct position such that the vehicle correctly moves in a first direction, and the second position may be an incorrect position such that the vehicle incorrectly moves in a different direction. The state of the switch may optionally refer to a health of the switch. For example, one or more components of the switch may have deteriorated and may require repair.

The back-office server may determine whether the sensed traffic control device information conflicts with stored vital and/or non-vital traffic control information stored in a database or a database-like structure accessible by the back-office server. Vital information may represent information that is encrypted, secured, protected, or the like. Alternatively, non-vital information may represent information that is insecure, decrypted, non-protected, or the like. The back-office server may send out a bulletin or other notification to other vehicle systems directing the other vehicle systems to change movement based on the sensed traffic control device information conflicting with the stored traffic control device information.

In one example, the back-office server can communicate a response signal (e.g., a digital signal, a radio signal, or the like) to a vehicle controller of the vehicle system, or another vehicle system. This response signal may confirm receipt of the sensor signal at the back-office server and/or may directions to change operation of the vehicle system, such as by slowing or stopping movement of the vehicle system. In one example, the onboard controller can be an onboard computer that is used in a positive train control system.

Optionally, the back-office server can use the response signal to automatically control one or more operational settings of the vehicle system (e.g., a brake setting and/or a throttle setting), to communicate the information to another vehicle that moves along the route, to alert an operator onboard the vehicle, to direct the operator onboard the vehicle to manually change one or more operational settings of the vehicle, or the like. Optionally, this server can use the sensor signal to schedule repair, inspection, or maintenance of the traffic control device.

While some embodiments described herein relate to rail vehicle systems, positive train control systems, and wayside devices, not all embodiments of the inventive subject matter are restricted to rail vehicles, positive train control systems, or wayside devices. One or more embodiments of the inventive subject matter may relate to other types or models of vehicle systems, such as automobiles, trucks, buses, mining vehicles, marine vessels, aircraft (manned or unmanned, such as drones), agricultural vehicles, or other off-highway vehicles. One or more embodiments may relate to control systems that control operation of vehicles other than positive train control systems. At least one embodiment relates to sensor assemblies that are not stationary wayside devices or systems.

Figure 1A:
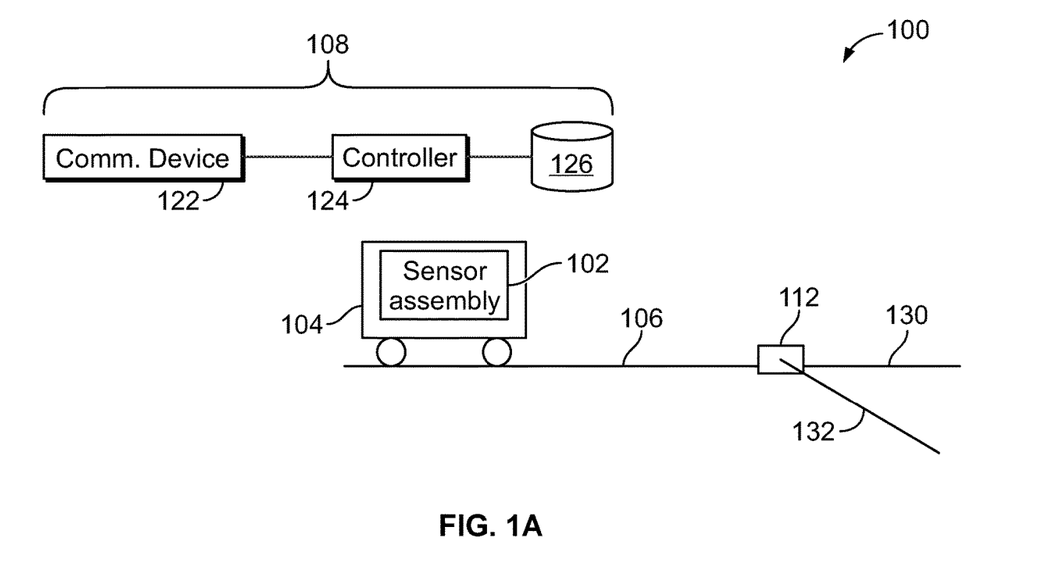
FIG. 1A schematically illustrates one example of a system.

FIG. 1A schematically illustrates one example of a system 100 that includes a vehicle system 104. The vehicle system can be rail vehicle systems, but optionally can be automobiles, trucks, buses, mining vehicles, marine vessels, aircraft, agricultural vehicles, or other off-highway vehicles. The illustrated vehicle system includes a single vehicle, but optionally can be formed from two or more vehicles that may travel together (by being mechanically coupled or by being mechanically separate but communicating with each other to travel together, such as in a convoy). The vehicle system travels along a route 106, such as tracks, roads, highways, land-based paths, airborne paths, waterways, or the like.

Figure 1B:
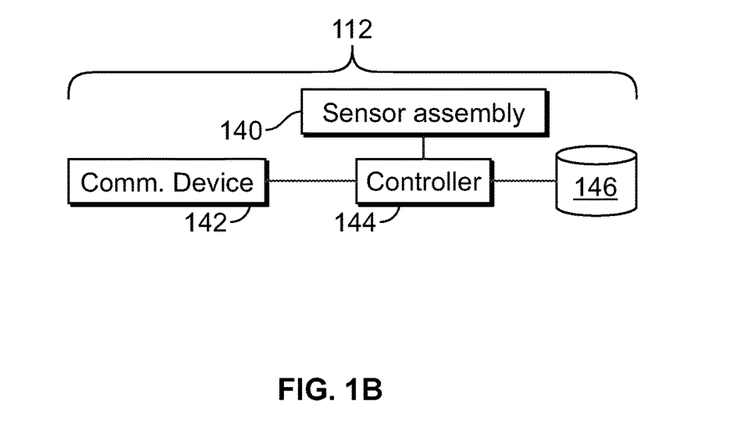
FIG. 1B illustrates a traffic control device of the system illustrated in FIG. 1A.

The system 100 may also include a traffic control device 112 that is disposed on the route along which the vehicle system moves. For example, FIG. 1B illustrates one example of the traffic control device. The illustrated traffic control device is a rail switch, but optionally may be a traffic light, a pedestrian gate, landing lights for aerial vehicles, buoys for marine vessels, or the like. For example, the traffic control device may be any alternative device that can control the flow of moving objects along intersecting paths. The paths may be rails, roads, pathways, airspace, waterways, or the like. In the illustrated embodiment, the traffic control device may be a switch that directs the vehicle system to move along a first pathway 130 or along a second pathway 132 based on a position of the switch.

In one or more embodiments, the traffic control device may be a mobile and/or stationary device. As one example, the traffic control device may be a stationary traffic light. Alternatively, the traffic control device may be an unmanned aerial device such as a drone, or may be disposed on the drone, that moves along the route. The drone may move and measure characteristics of vehicle systems over several different locations. For example, the mobile traffic control device may capture images of different sections or parts of the route, or may alternatively direct the flow of vehicles and/or pedestrians at different sections of the route.

The traffic control device can include a communication device 142 that communicates with the vehicle system. The communication device may include the same or similar components as other communication devices described herein. The traffic control device may include a controller 144, referred to herein as a device controller. The device controller can represent hardware circuitry that includes and/or is connected with one or more processors that perform operations of the traffic control device. A memory 146 of the traffic control device can store information about the traffic control device, such as an identification of the device, a location of the device, and a state of the device. In one example or a moving traffic control device, the device controller may update the information stored in the memory every time the device moves, or at intermittent times, or the like. Optionally, for a stationary traffic control device, the device controller may update the information stored in the memory periodically, or the like. The memory may also store information about the different vehicle systems that move past the traffic control device, such as, but not limited to, an identification of the vehicle system, a time stamp of when the vehicle system moved past the device, a number of times the vehicle system moves past the device (e.g., within a predetermined time period), a speed at which the vehicle moves past the device, or the like.

The traffic control device can include one or more sensor assemblies 140. The sensor assemblies can measure one or more characteristics of the traffic control device. For example, the sensor assemblies may include sensors that indicate a state of the traffic control device. The sensors may sense whether the traffic control device is operating in a first mode of operation or in a second mode of operation, for example if a traffic light is currently green or currently red. Optionally, the sensors may sense whether the rail switch is in a first position directing vehicles to move along the first pathway or in a second position directing the vehicle to move along the second pathway. For example, the sensors may sense whether the rail switch is in a first or second position based on one or more components of the rail switch, or by sensing movement of the vehicle system that moves across the rail switch, or a combination therein.

The vehicle system can include one or more sensor assemblies 102 disposed onboard the vehicle system. Optionally, a sensor assembly can be disposed on each vehicle of the vehicle system, or can be disposed on a single vehicle of the vehicle system. The sensor assembly can measure one or more characteristics of the vehicle system.

For example, the sensor assembly onboard a first vehicle can measure or detect characteristics of the first vehicle, and a second sensor assembly onboard a second vehicle can measure or detect characteristics of the second vehicle. The sensor assemblies may measure one or more characteristics of the route and/or the traffic control device.

The traffic control sensor assemblies communicate sensed traffic control device information with the one or more vehicle sensor assemblies. As one example, the sensed traffic control device information may include an identification of the device, a location of the device, a location with reference to other traffic control devices, a state of the device (e.g., a position, a health, a status, or the like). Optionally, the traffic control device information may include data corresponding to different vehicle systems that have traversed the device, times when the device was traversed by different vehicle systems, speeds at which the vehicle systems moved past and/or through the device, or the like. Optionally, the sensed traffic control device information may include a number of different vehicle systems, a number of different vehicles in each vehicle system, or the like, that have moved past, are expected to move past, or are currently moving past the traffic control device. For example, the traffic control device may be a stop light, and the sensed traffic control device information may include a number of cars that are moving in the intersection between intersecting routes at the stop light. Optionally, the traffic control device may be a rail switch, and the traffic control device may include a number of rail cars of a rail consist (e.g., mechanically and/or logically coupled), move past the rail switch.

In one or more embodiments, different vehicle sensor assemblies may communicate with each other, may communicate with the traffic control device, may communicate with one or more other sensor assemblies off-board the vehicle system, may communicate with an off-board database, or the like.

The system 100 can include a vital system or a protection system 108. In one or more embodiments, the protection system 108 may be referred to as a vital system, such that the vital system may be used to store, maintain, or the like, vital, encrypted, or protected information. The protection system may be an off-board database, or a database-like structure, that includes a communication device 122 that receives sensor signals from a communication device of the vehicle system. The communication device may include the same or similar components as other communication devices described herein. The protection system can include a controller 124, referred to herein as an off-board controller or a protection system controller. The off-board controller can represent hardware circuitry that includes and/or is connected with one or more processors that perform operations of the protection system. The off-board controller can examine the sensor signal received from the vehicle system and implement one or more responsive actions. As one example, the off-board controller may issue one or more speed restrictions. The speed restrictions can be a designation of one or more segments of the route in which vehicle systems are not allowed to move faster than a designated speed limit (e.g., which is slower than the speed limit of the route and/or than the vehicle systems are capable of moving). The off-board controller can identify the location of one or more vehicle systems and/or traffic control devices based on information included in the sensor signal.

A memory 126 of the protection system can store information about traffic control devices, vehicle systems that move along the route, or the like. As one example, the memory may store information about locations of traffic control devices and the corresponding identifications of the traffic control devices. Optionally, the memory may store information pertaining to the state of the traffic control devices, such as a status (on or off, in a first position or second position), a health (e.g., damage of the device, the state of damage of the device). Additionally or alternatively, the memory may store information about the vehicle systems move along the route that communicate sensor signals with the traffic control devices, information about which the vehicle systems have move and/or are moving along the route, or the like. In one or more embodiments, the memory may be any storage database or a database-like structure that may be accessible by the one or more processors of the protection system controller.

The protection system may be disposed off-board the vehicle systems and can communicate with the sensor assembly and/or the vehicle system to control or restrict movement of the vehicle system. For example, the protection system can communicate with the vehicle system to notify the vehicle system where the vehicle system is allowed to travel, how fast the vehicle system is allowed to travel, or the like. In one embodiment, the protection system represents a back-office server of a positive train control system. The back-office server may be a vital or a non-vital system such that data stored, contained, maintained, communicated between, or the like, may be vital (e.g., protected) and/or non-vital (e.g., non-protected) data. Alternatively, the protection system represents another computerized system that communicates with vehicle systems described herein.

Figure 2:
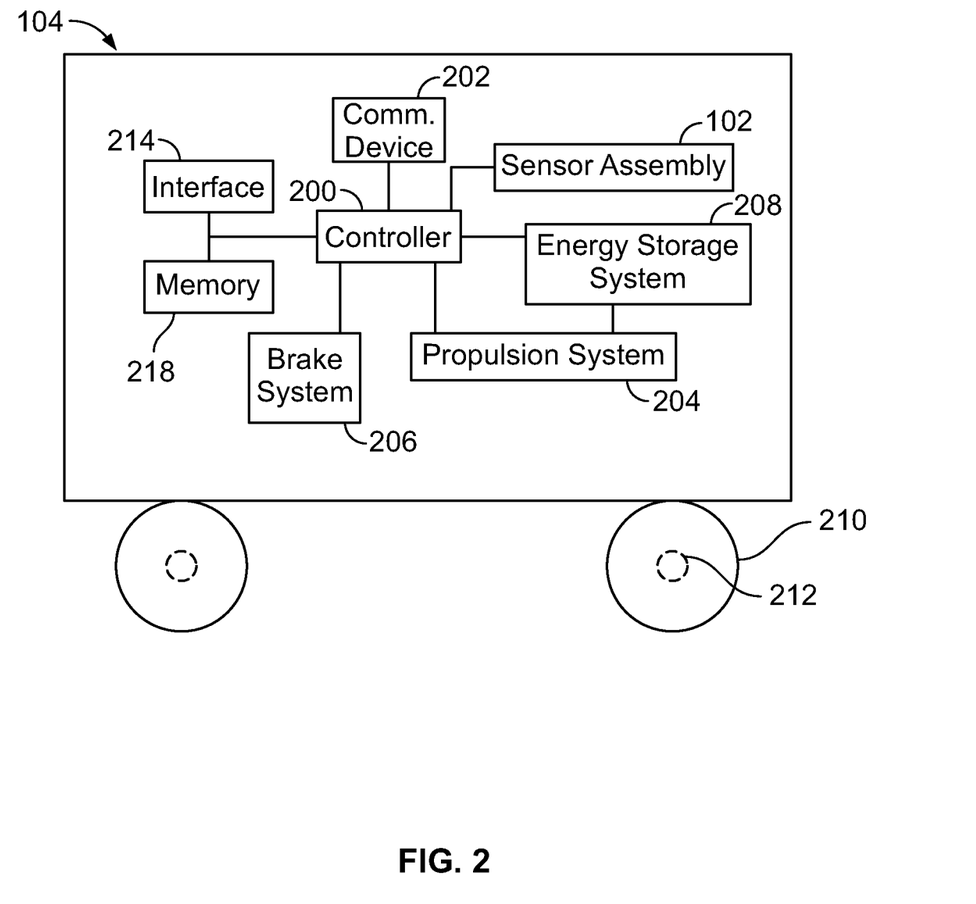
FIG. 2 schematically illustrates one example of a vehicle system.

FIG. 2 schematically illustrates one example of the vehicle system 104 shown in FIG. 1A. The vehicle system includes a controller 200, which can be referred to as the onboard controller. The onboard controller can represent hardware circuitry that includes and/or is connected with one or more processors that perform operations described in connection with the onboard controller. The onboard controller can communicate with onboard and/or off-board components via a communication device 202. The communication device can represent transceiving circuitry, one or more antennas, modems, or the like. In one or more embodiments, the communication device can receive and provide the data signals to the onboard controller. The communication device may be the same as or similar to the other communication devices described herein. For example, the communication device onboard the vehicle system may wirelessly communicate with the communication device(s) of the protection system, the communication device of the traffic control device, a communication device of another vehicle system, and/or a communication device of another vehicle of the vehicle system.

The vehicle system includes a propulsion system 204 that operates to move the vehicle system along the route. The propulsion system can represent one or more engines, motors, transmissions, propellers, or the like, that generate propulsion to move the vehicle system. The vehicle system also can include a brake system 206 that operates to slow or stop movement of the vehicle system. The brake system can include air brakes, friction brakes, motors (e.g., used for dynamic or regenerative braking), or the like. The onboard controller can communicate control signals with the propulsion system and/or the brake system to control or change movement of the vehicle system.

The vehicle system can include an onboard energy storage system 208 that includes one or more devices that store and/or generate electric current. This current can be used to power components onboard the vehicle system, such as the propulsion system, a lighting system, or the like. Optionally, the energy storage system can include or represent one or more motors of the propulsion system and/or the brake system (e.g., where the motors generate current during regenerative braking). The energy storage system can include one or more batteries, fuel cells, photovoltaic devices, flywheels, alternators, generators, or the like. The onboard controller can communicate control signals to the energy storage system to control supply of the current to one or more components of the vehicle system.

The onboard controller can also control one or more settings or operations of the sensor assembly. The controller may direct different sensors of the sensor assembly to sense at one or more different times, for different lengths of time (e.g., intermittently, continuously, or the like). Optionally the sensor may be an optical sensor, and the onboard controller may control a direction the optical sensor faces and/or orientation of the optical sensor to capture images and/or video of different components of the vehicle system, different segments of the route, or the like.

In one or more embodiments, the sensor assembly may be disposed or coupled with a rear vehicle of a vehicle consist. The vehicle consist may be a platoon, a group, a swarm, a flotilla, or the like, of two or more vehicles that may be mechanically and/or logically coupled with each other. For example, the sensor assembly may be disposed on a last or final vehicle of the vehicle consist as the vehicle system moves along the route in a direction toward the traffic control device. The rear vehicle may be the final vehicle of the vehicle consist to move past, through, over, or the like, the traffic control device. Optionally, the sensor assembly may be disposed on a lead vehicle of the vehicle consist. Optionally, a sensor assembly may be disposed on each vehicle of a vehicle consist.

One or more sensors of the sensor assembly can detect, measure, or otherwise sense a traffic control device within a predetermined area or vicinity of the vehicle system. As one example, when a vehicle system moves along a route and moves within a predetermined area surrounding a traffic control device, the sensor assembly communicates with the onboard controller to communicate with the traffic control device.

The onboard controller may request sensed traffic control device information from the traffic control device that is detected, measured, or otherwise sensed by the one or more sensors of the device sensor assembly. Optionally, the sensor assembly of the traffic control device may communicate sensed traffic control device information at predetermined times, and the information may be communicated with one or more vehicles that are within a predetermined area surrounding the device. Optionally, the traffic control device may identify when a vehicle system has entered into a predetermined area and may initiate a communication link between the device and the vehicle system to communicate the sensed device information with the vehicle system.

Returning to FIGS. 1A and 1B, the one or more sensors of the traffic control device can detect, measure, or otherwise sense one or more characteristics of the vehicle system and/or one or more characteristics of the traffic control device as the vehicle system moves along the route. As one example, the sensor can be an optical sensor, such as a camera, that outputs images and/or videos of the vehicle system, the traffic control device, and/or the route. For example, the sensor can generate images and/or videos of the route and/or the traffic control device to identify the traffic control device, to identify damage or other issues with the traffic control device, or the like. These images can also be examined by the device controller and/or the onboard controller to identify the traffic control device, identify a location of the traffic control device, and determine a state of the traffic control device. The images and/or video can be obtained to examine the state of the traffic control device, to determine whether the traffic control device is in a correct or incorrect position, to determine a health of the traffic control device, or the like.

The device sensor can include an accelerometer that measures vibrations or other movements of the vehicle system. The device sensor can be a radar system that measures a time-of-flight to the vehicle system. This can be used to determine a size of the vehicle system, such as a length of the vehicle system (by identifying changes in the time-of-flight, the leading and trailing ends of the vehicle system can be identified), the number of vehicles in the vehicle system (changes in the time-of-flight can indicate passage of different vehicles), or the like. The device sensor can be a lidar system that measures changes in a structured light array. Changes in reflection of the lights in the structured light array can be used to identify the shape of the vehicle system, the size of the vehicle system, the number of vehicles in the vehicle system, or the like.

Optionally, the device sensor can include an audible sensor (e.g., a microphone, piezoelectric element, or the like) that senses sounds generated by movement of the vehicle system. These sounds can indicate issues or problems with the vehicle system, damage to the route and/or the route device, or the like. The device sensor optionally can measure one or more characteristics of the route, the traffic control device, the environment, of the like. For example, the device sensor can examine the route and/or traffic control device to determine whether the route and/or traffic control device is damaged (e.g., by injecting electric signals into conductive portions of the route to determine whether the route and/or route device is broken). The device sensor can measure temperatures, wind speed and/or direction, humidity, emissions in the air, or the like, of the environment outside of the vehicle system.

The traffic control device may communicate the sensed traffic control device information with the onboard controller of the vehicle system as a sensor signal. The onboard controller can store the sensed traffic control device information of the sensor signal in a tangible and non-tangible computer-readable storage medium (e.g., memory), such as a computer hard drive, optical disc, server, or the like. The characteristics may be stored for later examination (e.g., accident reconstruction analysis), for later communication (e.g., with the protection system) to identify trends or other changes in the characteristics over time, etc. Optionally, the onboard controller can examine the characteristics of the vehicle, the route, and/or the traffic control device to determine an identification of the traffic control device, identify a location and/or position of the traffic control device, determine a state of the traffic control device, or the like. The onboard controller may generate a vehicle signal that can be communicated to the protection system, to another vehicle that moves along the route, to two or more different protection systems, or the like.

Figure 3:
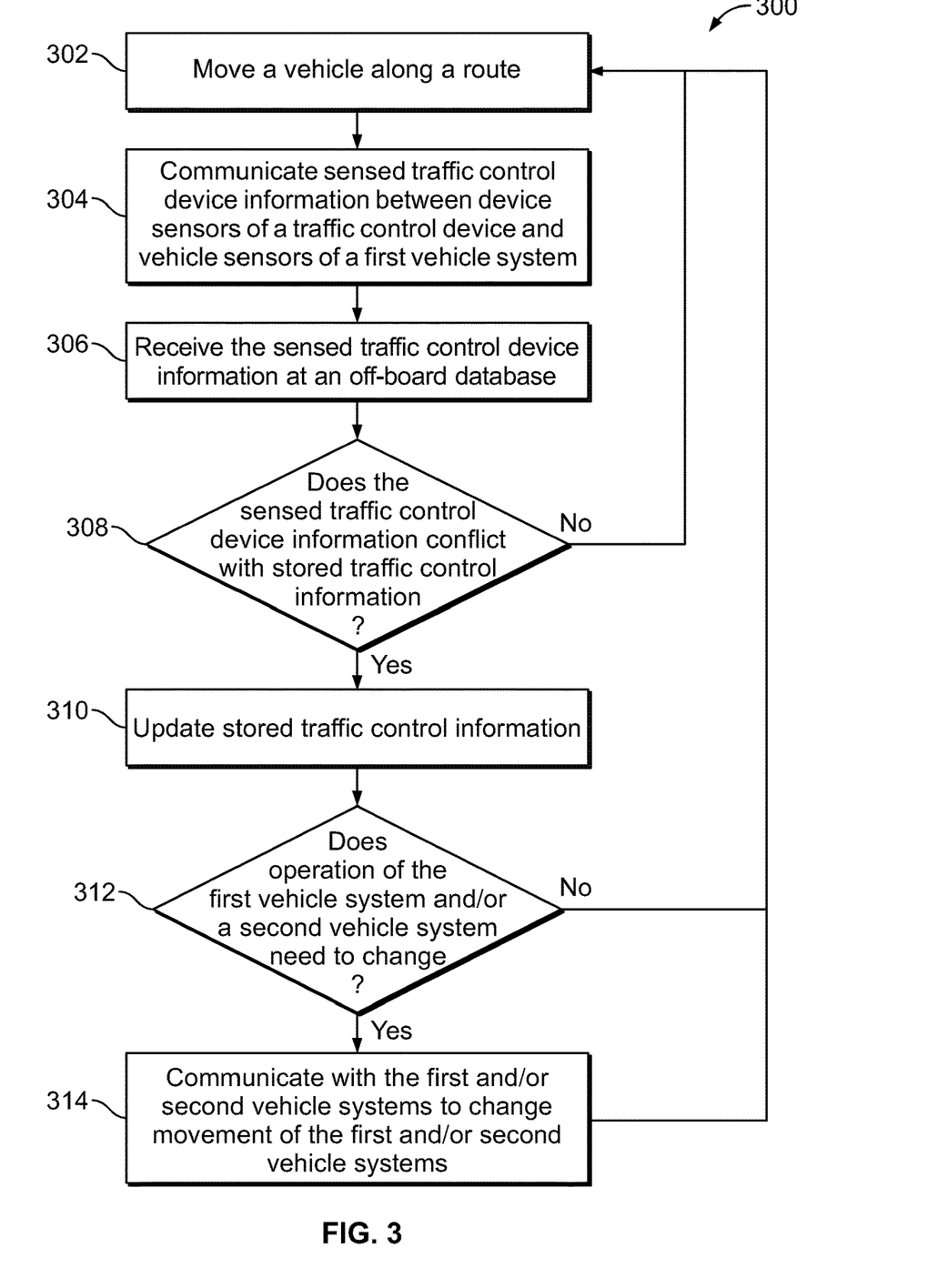
FIG. 3 illustrates a flowchart of one example of a method for monitoring traffic control devices.

FIG. 3 illustrates a flowchart of one example of a method 300 for monitoring traffic control devices. The method can represent operations performed by the protection system, the onboard controller of the vehicle system, and/or the device controller of the traffic control device described above. In one or more embodiments, each of the steps of the method 300 may be completed at substantially the same time, or at different times relative to each other. Optionally, one or more of the steps may not be completed. For example, the off-board controller may communicate with a second vehicle to change movement of the second vehicle system, but may not communicate with a first vehicle system (e.g., the vehicle system that communicates the sensed traffic control device information). Optionally, any of the steps of the method 300 may be completed in any alternative order or may be omitted from the method.

At 302, the vehicle system, such as a first vehicle system moves along the route. As the vehicle system moves along the route, the vehicle system may come upon, come within an area of, or the like, one or more traffic control devices, such as a switch. At 304, the traffic control device establishes a communication link with the vehicle system and communicates sensed traffic control device information with the vehicle system. The traffic control device information may include information about the device (e.g., location, status, health, identification, or the like), information about the route (e.g., status, health, identification, or the like), information about the first vehicle system (e.g., number of vehicles of the system, speed of the system, identification of the system, a weight of the vehicle system and/or weight of each vehicle of the system). or the like. Optionally, the information may include environmental information (e.g., relative temperature and/or humidity), information about speed limits of the route, a time stamp associated with the information, or the like.

As one example, the traffic control device may be a switch, and the switch may have an identification or reference number, may be identified based on the style of switch or route device, or may have any alternative identifying features or components. Additionally or alternatively, the sensed traffic control device information may include a location of the traffic control device. The location may be a geographical location or may be a location with reference to the route (e.g., the switch is disposed at predetermined distances away or apart from another switch on the route, for example, that the vehicle system previously traversed, etc.).

Additionally or alternatively, the sensed traffic control device information may include a state of the traffic control device. As one example, the device may be a switch, and the state of the switch may refer to a position of the switch. The sensed traffic control device information may indicate positions of the traffic control device at the intersections between routes. For example, the position may be a first position that directs the vehicle system to move along the first pathway 130 (shown in FIG. 1A). Alternatively, the position may be a second position that directs the vehicle system to move along the second pathway 132. One or more sensors of the traffic control device may sense one or more characteristics of the device and/or of the vehicle system to determine the position. Optionally, the traffic control device may be a pedestrian gate, and the sensed device information may indicate if the gate is up, if the gate is down, if the gate is moving from up to down or down to up, or the like.

Optionally, the state of the traffic control device may refer to a health of the traffic control device. The sensed traffic control device information may indicate a health of the traffic control device at the intersections between routes. For example, the device sensor can examine the route and/or traffic control device to determine whether the route and/or traffic control device is damaged by injecting electric signals into conductive portions of the route to determine whether the route and/or route device is broken. Optionally, the onboard controller may receive images and/or video of the traffic control device from the traffic control device to determine whether the device, or at least a segment, component, section, or the like, of the device is broken or deteriorated passed a predetermined threshold. In another embodiment, the traffic control device may be a mobile device (such as a drone) may fly over the route and capture images of the route to determine whether the route is damaged.

Optionally, the state of the traffic control device may refer to any other aspects of functionality of the route device. For example, the traffic control device may be a traffic light, and the device controller may determine whether the traffic light is operating correctly or is operating incorrectly based on sensed information obtained, collected, or otherwise sensed by the device sensors. Optionally, the traffic control device may be a pedestrian gate, and the device controller may determine whether the pedestrian gate drops and/or raises at the correct time, drops and/or raises at an incorrect time, remains in place for a predetermined or preset amount of time, or the like. The device sensors may sense characteristics of the vehicle, the route, and/or the traffic control device, and the device controller may determine the state of the traffic control device based on the characteristics of the vehicle, the route, and/or the traffic control device.

At 306, the one or more processors of the protection system receive the sensor signal including the sensed traffic control device information from the traffic control device sensors via the first vehicle system. The processors of the off-board controller may receive plural different signals from one or more vehicle systems pertaining to sensed traffic control device information indicating states of different traffic control devices at intersections between the routes in the transportation network. The transportation network may be represented by different types of routes that are interconnected. For example, the transportation network may include roads (or any land-based paths) and rail tracks that may intersect at various intersections. Optionally, the transportation network may be represented by a common type of routes, such as rail tracks, highways, or the like. In one or more embodiments, the onboard controller may receive the traffic control device information from the device sensors, and may determine one or more characteristics of the device, the route, or the like, based on the characteristics. The onboard controller may communicate only the determined characteristics with the protection system, may communicate the determined characteristics and the sensed traffic control device information with the protection system, or may communicate the determined characteristics and the device information with the protection system. Optionally, one or more other protection systems may receive sensor signals from the onboard controlling indicating the states of the traffic control devices.

At 308, a decision is made whether the sensed traffic control device information conflicts with stored traffic control device information. The stored traffic control device information may be stored in the memory of the protection system, in a database or a database-like structure separate from the protection system but accessible by the protection system, or the like. In one embodiment, the protection system (e.g., the vital system) may be unable to write and/or receive vital information from the database. Optionally, the protection system (e.g., the vital system) may be able to write and/or receive non-vital information from the database or a database-like structure. The sensed device information may be allowable to conflict with the stored information up to a predetermined threshold. For example, the stored information may be a range of information, and a predetermined percentage of the sensed device information may need to fall within the range of the stored information. Optionally, the entirety of the sensed device information may need to be in line with, match with, corroborate with, or the like, the stored information.

If the sensed traffic control device information does not conflict with the stored traffic control information, flow of the method 300 proceeds toward 302, and the method repeats while the first vehicle system moves along the route or for a predetermined amount of time or length of travel of the vehicle system. Alternatively, of the sensed device information conflicts with the stored information, then flow of the method 300 proceeds toward 310.

At 310, the one or more processors of the off-board controller update the stored traffic control device information in the database or the database-like structure with the sensed traffic control device information. The stored traffic control device information may be updated by being replaced by the sensed traffic control device information receives from the vehicle systems. Optionally, the one or more processors of the off-board controller may communicate an additional bulletin to one or more vehicle systems indicating that the stored device information has been updated. Optionally, the bulletin may also include the new stored traffic control device information, may indicate what information was updated, may include one or more instructions for the operators onboard the vehicle systems such as communicating a confirmation of receipt back to the off-board controller, or the like.

At 312, the off-board controller determines whether operation of the first vehicle system, a second vehicle system, or another vehicle system needs to change based on sensed traffic control device information conflicting with the stored traffic control device information. As one example, the first and second vehicle systems may be systems having like vehicles. For example, the first vehicle systems may be rail vehicle systems, and the second vehicle systems may be other rail vehicle systems. Optionally, the first and second vehicle systems may be systems having different vehicles. For example, the first vehicle systems may be rail vehicle systems, and the second vehicle systems may be aerial vehicles, automobiles, or any combination therein. Optionally, the first vehicle systems may include different vehicles operably coupled together (e.g., mechanically and/or logically) such as one or more rail vehicles and one or more aerial vehicles.

If operation of the first and second vehicle systems does not need to change, then flow of the method returns to 302, and the method repeats while the first vehicle system moves along the route or for a predetermined amount of time or length of travel of the vehicle system. Alternatively, if operation of one or more of the first or second vehicle systems needs to change, then flow of the method proceeds toward 314.

At 314, the off-board controller communicates with the first vehicle system and/or the second vehicle systems directing the vehicle systems to change movement based on the sensed traffic control device information conflicting with the stored information. For example, the first vehicle system may communicate the sensed traffic control device information with the off-board controller, and the off-board controller may communicate with the first vehicle system and/or another second vehicle system to change movement of one or both of the first and second vehicle systems.

For example, based on a location of the other vehicle systems, whether the other vehicle systems are moving along the same route as the first vehicle system, or the like, in an embodiment where the protection system is or includes a back-office server of a positive train control system, the off-board controller can generate or change a movement authority, a movement bulletin, or a movement schedule for the first vehicle system and/or for at least one other vehicle system responsive to determining that the sensed information conflicts with the stored information.

The movement authority or bulletin may include movement areas that the off-board controller determined to be permissible movement areas of the first vehicle system, and any other vehicle system based on the stored traffic control device information. As one example, the first and/or second vehicle systems may have received information pertaining to permissible movement areas prior to the vehicles moving along the route. The permissible movement areas may change based on the sensed device information conflicting with the stored device information. The off-board controller may communicate the new permissible movement areas with the first and/or second vehicle systems.

In one embodiment, the off-board controller may remotely change a vehicle speed, gear setting, engine speed, brake engagement, or the like, of the first and/or second vehicle systems. For example, the off-board controller may remotely control movement of the first vehicle system and/or the second vehicle system responsive to determining that the sensed traffic control device information conflicts with the stored traffic control device information. Optionally, the off-board controller may communicate a bulletin to the operator onboard the first and/or second vehicle systems to manually change an operational setting (e.g., brake setting, throttle setting) of one or each of the vehicles of the first and/or second vehicle system. Optionally, the off-board controller may communicate an alert to the operator.

Optionally, the movement authority, bulletin, or schedule can prevent the second or another vehicle system from traveling into an area surrounding, or proximate to the traffic control device where the first vehicle system is, will be located, or will be stopped. For example, the positive train control system can selectively issue a signal to one or more vehicle systems to prevent those vehicle systems from approaching a traffic control device that may be in an incorrect position, have an incorrect state, or a combination therein.

With respect to a positive train control system as the protection system, the vehicle systems may include onboard components that communicate with the positive train control system. These components may limit movement of the vehicle systems based on movement authorities, bulletins, etc., that are issued by the back-office server (e.g., the off-board controller) of the positive train control system (e.g., the protection system). Different back-office servers may be associated with different areas in which the movement authorities, bulletins, etc. are issued. For example, each back-office server of several back office servers may issue movement authorities, bulletins, or the like, for the vehicle systems traveling in an area associated with that back-office server, but not for the vehicle systems traveling in an area associated with another back-office server. For example, the onboard controller may automatically communicate with a first back-office server (e.g., a first off-board database) when the vehicle system is in a first location, and the onboard controller may automatically communicate with a second back office server (e.g., a second off-board database) when the vehicle system is in a different location, such as a different city, county, state, or the like.

Communication with different back office servers may require onboard components of the vehicle system to have different versions of software, different communication protocols, or the like. A vehicle system having a software version or communication protocol that can communicate with the back-office server associated with route segments in one area may not be the correct version or protocol for communicating with another back-office server associated with route segments in another area. The vehicle system may need to update or change the software version or communication protocol before entering into and/or traveling within the other area.

As one example, the onboard controller may wirelessly communicate with onboard components of the vehicle system to determine the version of software running onboard the vehicle system (that communicates with the off-board controller and with the traffic control device controller). As another example, the onboard controller can communicate with onboard components of the vehicle system to determine the communication protocol used by the onboard components to communicate with the off-board controller. As another example, the onboard controller can communicate with onboard components of the vehicle system to determine the contents of a database (e.g., memory) onboard the vehicle system. The onboard controller can determine whether any of these characteristics indicates that the vehicle system is able to communicate with a back office server (e.g., the off-board controller) or with a traffic control device, or whether a software version change, a change in communication protocol, and/or a modification of the information stored onboard the vehicle system is needed before the vehicle system can communicate with the off-board controller.

If the onboard controller determines that a change in software, communication protocol, and/or database is needed, then the onboard controller can direct the communication device to communicate a sensor signal to the vehicle system and/or the back-office server. This sensor signal can include the software change, communication protocol change, and/or database change, or can direct the vehicle system to obtain the software, protocol, and/or database change. This can ensure that the vehicle system has the correct or proper software version, communication protocol, and/or database content for entering into and/or traveling within an area associated with a back-office server of a positive train control system.

In one or more embodiments, a system includes one or more processors to receive sensed traffic control device information from first vehicle systems in a transportation network formed from interconnected routes. The sensed traffic control device information indicates states of traffic control devised at intersections between the routes in the transportation network. The one or more processors determine whether the sensed traffic control device information conflicts with stored traffic control device information stored in a database accessible by the one or more processors. The one or more processors send one or more bulletins to one or more second vehicle systems to change movement of the one or more second vehicle systems responsive to determining that the sensed traffic control device information conflicts with the stored traffic control device information.

Optionally, the one or more processors may determine permissible movement areas of one or more of the first vehicle systems or the one or more second vehicle systems based on the stored traffic control device information.

Optionally, the one or more processors may receive the sensed traffic control device information from traffic control device sensors via the first vehicle systems.

Optionally, the sensed traffic control device information may include one or more characteristics of one or more of one of the traffic control devices or the route obtained by the traffic control device sensors.

Optionally, the sensed traffic control device information may indicate positions of the traffic control devices at the intersections between the routes.

Optionally, the sensed traffic control device information may indicate a health of the traffic control devices at the intersections between the routes.

Optionally, the one or more processors may remotely control movement of at least one of the first vehicle systems responsive to determining that the sensed traffic control device information conflicts with the stored traffic control device information.

Optionally, the one or more processors may update the stored traffic control device information in the database based on the sensed traffic control device information received from the first vehicle systems.

Optionally, the one or more processors may send one or more additional bulletins to the one or more second vehicle systems responsive to updating the stored traffic control device information in the database.

In one or more embodiments, a method includes receiving sensed traffic control device information from first vehicle systems in a transportation network formed from interconnected routes. The sensed traffic control device information may indicate states of traffic control devices at intersections between the routes in the transportation network. A determination is made whether the sensed traffic control device information conflicts with stored traffic control device information stored in a database, and one or more bulletins may be sent to one or more second vehicle systems to change movement of the one or more second vehicle systems responsive to determining that the sensed traffic control device information conflicts with the stored traffic control device information.

Optionally, the method may include determining permissible movement areas of one or more of the first vehicle systems or the one or more second vehicle systems based on the stored traffic control device information.

Optionally, the sensed traffic control device information may include one or more characteristics of one or more of one of the traffic control devices or the route obtained by the traffic control device sensors.

Optionally, the sensed traffic control device information may indicate positions of the traffic control devices at the intersections between the routes.

Optionally, the sensed traffic control device information may indicate a health of the traffic control devices at the intersections between the routes.

Optionally, the method may include remotely controlling movement of at least one of the first vehicle systems responsive to determining that the sensed traffic control device information conflicts with the stored traffic control device information.

Optionally, the method may include updating the stored traffic control device information in the database based on the sensed traffic control device information received from the vehicle systems.

Optionally, the method may include sending one or more additional bulletins to the one or more other second vehicle systems responsive to updating the stored traffic control device information in the database.

In one or more embodiments, a system for monitoring route devices in a transportation network includes one or more processors that receive sensed route device information from first vehicle systems in the transportation network formed from interconnected routes. The sensed route device information may indicate states of route devices at intersections between the routes in the transportation network. The one or more processors determine whether the sensed route device information conflicts with the stored route device information stored in a database accessible by the one or more processors. The processors send one or more bulletins to one or more second vehicle systems to change movement of the one or more second vehicle systems responsive to determining that the sensed route device information conflicts with the stored route device information. The processors remotely control movement of at least one of the first vehicle systems responsive to determining that the sensed route device information conflicts with the stored route device information.

Optionally, the one or more processors may update the stored route device information in the database based on the sensed route device information received from the first vehicle systems, and may send one or more additional bulletins to the one or more second vehicle systems responsive to updating the stored route device information in the database.

As used herein, the terms "processor" and "computer," and related terms, e.g., "processing device," "computing device," and "controller" may be not limited to just those integrated circuits referred to as a computer, but refer to a microcontroller, a microcomputer, a programmable logic controller (PLC), field programmable gate array, and application specific integrated circuit, and other programmable circuits and vice versa. Collectively, these processors are referred to as a controller herein. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    one or more processors configured to receive sensed traffic control device information from first vehicle systems in a transportation network formed from interconnected routes, the sensed traffic control device information indicating states of traffic control devices at intersections between the routes in the transportation network, wherein the traffic control devices in first states are configured to direct the first vehicle systems in a first direction and the traffic control devices in second states are configured to direct the first vehicle systems in a second direction,
    the one or more processors configured to determine whether the sensed traffic control device information conflicts with stored traffic control device information stored in a database accessible by the one or more processors, wherein the stored traffic control device information is configured to direct the first vehicle systems to move in the first direction, and the sensed traffic control device information is configured to direct the first vehicle system to move in the second direction, and
    the one or more processors configured to send one or more bulletins to one or more second vehicle systems to change movement of the one or more second vehicle systems responsive to determining that the sensed traffic control device information conflicts with the stored traffic control device information.

2. The system of claim 1, wherein the one or more processors are configured to determine permissible movement areas of one or more of the first vehicle systems or the one or more second vehicle systems based on the stored traffic control device information.

3. The system of claim 1, wherein the one or more processors are configured to receive the sensed traffic control device information from traffic control device sensors via the first vehicle systems.

4. The system of claim 3, wherein the sensed traffic control device information includes one or more characteristics of one or more of one of the traffic control devices or the routes obtained by the traffic control device sensors.

5. The system of claim 1, wherein the sensed traffic control device information indicates positions of the traffic control devices at the intersections between the routes.

6. The system of claim 1, wherein the sensed traffic control device information indicates a health of the traffic control devices at the intersections between the routes.

7. The system of claim 1, wherein the one or more processors are configured to remotely control movement of at least one of the first vehicle systems responsive to determining that the sensed traffic control device information conflicts with the stored traffic control device information.

8. The system of claim 1, wherein the one or more processors are configured to update the stored traffic control device information in the database based on the sensed traffic control device information received from the first vehicle systems.

9. The system of claim 8, wherein the one or more processors are configured to send one or more additional bulletins to the one or more second vehicle systems responsive to updating the stored traffic control device information in the database.

10. A method comprising:
receiving sensed traffic control device information from first vehicle systems in a transportation network formed from interconnected routes, the sensed traffic control device information indicating states of traffic control devices at intersections between the routes in the transportation network, wherein the traffic control devices in first states are configured to direct the first vehicle systems in a first direction and the traffic control devices in second states are configured to direct the first vehicle systems in a second direction;
determining whether the sensed traffic control device information conflicts with stored traffic control device information stored in a database, wherein the stored traffic control device information is configured to direct the first vehicle systems to move in the first direction, and the sensed traffic control device information is configured to direct the first vehicle systems to move in the second direction; and
sending one or more bulletins to one or more second vehicle systems to change movement of the one or more second vehicle systems responsive to determining that the sensed traffic control device information conflicts with the stored traffic control device information.

11. The method of claim 10, further comprising determining permissible movement areas of one or more of the first vehicle systems or the one or more second vehicle systems based on the stored traffic control device information.

12. The method of claim 10, further comprising receiving the sensed traffic control device information from traffic control device sensors via the first vehicle systems.

13. The method of claim 12, wherein the sensed traffic control device information includes one or more characteristics of one or more of one of the traffic control devices or the routes obtained by the traffic control device sensors.

14. The method of claim 10, wherein the sensed traffic control device information indicates positions of the traffic control devices at the intersections between the routes.

15. The method of claim 10, wherein the sensed traffic control device information indicates a health of the traffic control devices at the intersections between the routes.

16. The method of claim 10, further comprising remotely controlling movement of at least one of the first vehicle systems responsive to determining that the sensed traffic control device information conflicts with the stored traffic control device information.

17. The method of claim 10, further comprising updating the stored traffic control device information in the database based on the sensed traffic control device information received from the first vehicle systems.

18. The method of claim 17, further comprising sending one or more additional bulletins to the one or more second vehicle systems responsive to updating the stored traffic control device information in the database.

19. A system for monitoring route devices in a transportation network, the system comprising:
one or more processors configured to receive sensed route device information from first vehicle systems in the transportation network formed from interconnected routes, the sensed route device information indicating states of route devices at intersections between the routes in the transportation network, wherein the route devices in first states are configured to direct the first vehicle systems in a first direction and the route devices in second states are configured to direct the first vehicle systems in a second direction,
the one or more processors configured to determine whether the sensed route device information conflicts with stored route device information stored in a database accessible by the one or more processors, wherein the stored traffic control device information is configured to direct the first vehicle systems to move in the first direction, and the sensed traffic control device information is configured to direct the first vehicle systems to move in the second direction,
the one or more processors configured to send one or more bulletins to one or more second vehicle systems to change movement of the one or more second vehicle systems responsive to determining that the sensed route device information conflicts with the stored route device information, and
the one or more processors are configured to remotely control movement of at least one of the first vehicle systems responsive to determining that the sensed route device information conflicts with the stored route device information.

20. The system of claim 19, wherein the one or more processors are configured to update the stored route device information in the database based on the sensed route device information received from the first vehicle systems, and send one or more additional bulletins to the one or more second vehicle systems responsive to updating the stored route device information in the database.

* * * * *